(12) United States Patent
Imbert et al.

(10) Patent No.: US 12,741,743 B2
(45) Date of Patent: Sep. 22, 2026

(54) SYSTEM AND METHOD FOR CONTROLLING AN AIRCRAFT SEAT AND ITS ENVIRONMENT VIA A WIRELESS CONNECTION

(71) Applicant: AIRBUS ATLANTIC, Rochefort (FR)

(72) Inventors: Vincent Imbert, Rochefort (FR); Julien Duchesne, Rochefort (FR)

(73) Assignee: AIRBUS ATLANTIC SAS, Rochefort (FR)

( * ) Notice: Subject to any disclaimer, the term of this patent is extended or adjusted under 35 U.S.C. 154(b) by 311 days.

(21) Appl. No.: 17/799,655

(22) PCT Filed: Feb. 17, 2021

(86) PCT No.: PCT/EP2021/053895
§ 371 (c)(1),
(2) Date: Aug. 12, 2022

(87) PCT Pub. No.: WO2021/165324
PCT Pub. Date: Aug. 26, 2021

(65) Prior Publication Data

US 2023/0070509 A1 Mar. 9, 2023

(30) Foreign Application Priority Data

Feb. 17, 2020 (FR) ...................................... 2001529

(51) Int. Cl.
*B64D 11/06* (2006.01)
*B60N 2/02* (2006.01)
(Continued)

(52) U.S. Cl.
CPC ........ *B64D 11/0639* (2014.12); *B60N 2/0244* (2013.01); *B64D 11/0015* (2013.01);
(Continued)

(58) Field of Classification Search
CPC .. B60N 2/0244; B64D 11/0015; B64D 11/06; B64D 11/0639; B64D 11/064; H04W 4/80
See application file for complete search history.

(56) References Cited

U.S. PATENT DOCUMENTS 9,888,337 B1 * 2/2018 Zalewski ........... G06Q 30/0635
11,432,649 B2 * 9/2022 Beech ................. A47C 1/0242
(Continued)

FOREIGN PATENT DOCUMENTS

CN 203254985 U 10/2013
DE 102015105617 A1 * 10/2016 ......... B64D 11/0639
(Continued)

*Primary Examiner* — Vincent H Tran
(74) *Attorney, Agent, or Firm* — H&I PARTNERS; Chai Im; C. Andrew Im

(57) ABSTRACT

A system to control a seat and its environment in a cabin of a transportation vehicle. A functional controller of the seat is connected to an electric controller to activate electric actuators and/or effectors, such as electric motors of the seat. The functional controller includes a wireless communication module to establish a wireless link with at least one portable electronic device associated with a passenger of the seat. The portable electronic device enables the passenger, by means of a dedicated computer interface, to control the actuators and/or the effectors of the seat, and/or to communicate with on-board crew on a local network of the transportation vehicle. The wireless communication module communicates on the local network. Also, a wireless control method implemented by the system is provided.

13 Claims, 3 Drawing Sheets

(51) Int. Cl.
*B64D 11/00* (2006.01)
*H04W 4/80* (2018.01)

(52) U.S. Cl.
CPC .......... *B64D 11/06* (2013.01); *B64D 11/0624* (2014.12); *H04W 4/80* (2018.02); *B60N 2/0228* (2013.01)

(56) References Cited

U.S. PATENT DOCUMENTS

| | | | | |
|---|---|---|---|---|
| 12,312,089 | B2 * | 5/2025 | Fagan | B64D 11/0648 |
| 2004/0099766 | A1 * | 5/2004 | Pratt, Jr. | B64D 11/0649 244/118.6 |
| 2009/0152915 | A1 * | 6/2009 | Krasna | A47C 7/624 297/217.3 |
| 2010/0224727 | A1 * | 9/2010 | Bauer | B64D 11/00151 244/118.5 |
| 2014/0319895 | A1 * | 10/2014 | Lange-Mao | G01S 17/86 297/463.1 |
| 2015/0017915 | A1 * | 1/2015 | Hennequin | H04B 1/3822 455/41.2 |
| 2015/0375865 | A1 | 12/2015 | Fischer et al. | |
| 2016/0302986 | A1 * | 10/2016 | Haladova | A61G 7/015 |
| 2016/0304207 | A1 * | 10/2016 | Carles | G08C 17/02 |
| 2016/0311348 | A1 * | 10/2016 | Watson | B64D 11/0015 |
| 2017/0015422 | A1 * | 1/2017 | Garing | B64D 11/0643 |
| 2017/0282755 | A1 | 10/2017 | Gordiet | |
| 2018/0049250 | A1 * | 2/2018 | Perng | H04W 76/10 |
| 2018/0065521 | A1 * | 3/2018 | Vela | B60N 2/231 |
| 2018/0075717 | A1 * | 3/2018 | Reinbold | H04N 21/41265 |
| 2018/0170550 | A1 | 6/2018 | Streckert et al. | |
| 2018/0352959 | A1 * | 12/2018 | Zhang | A47C 1/03 |
| 2019/0009695 | A1 * | 1/2019 | Schonfeld | B60N 2/0292 |
| 2019/0218728 | A1 * | 7/2019 | Valencia | E01D 21/00 |
| 2019/0328138 | A1 * | 10/2019 | Labrosse | A47C 7/72 |
| 2020/0339266 | A1 * | 10/2020 | McMillan | H04W 4/80 |
| 2021/0354611 | A1 * | 11/2021 | Migneco | B60N 2/0022 |

FOREIGN PATENT DOCUMENTS

| | | | |
|---|---|---|---|
| DE | 102018208837 | A1 | 12/2019 |
| WO | 2015/200368 | A1 | 12/2015 |

* cited by examiner

SYSTEM AND METHOD FOR CONTROLLING AN AIRCRAFT SEAT AND ITS ENVIRONMENT VIA A WIRELESS CONNECTION

RELATED APPLICATIONS

This application is a § 371 application of PCT/EP2021/053895 filed Feb. 17, 2021, which claims priority from French Patent Application No. 2001529 filed Feb. 17, 2020, each of which is incorporated herein by reference in its entirety.

TECHNICAL FIELD

The present invention belongs to the general field of avionics, in particular systems for controlling on-board equipment of an aircraft of the airplane type and relates more particularly to a system and a method for controlling an aircraft seat and/or its environment via a wireless connection, such as Bluetooth, by means of a portable electronic device such as a smartphone.

BACKGROUND OF THE INVENTION

Airline companies are subject to a constant requirement for reducing their operating costs. A common means for saving operating costs consists in reducing the weight of the aircraft. Indeed, the weight reduction enables airline companies to reduce fuel costs. These being considerable, airline companies should therefore find a means to remain competitive and profitable.

In the design of aircraft seats, weight is a major consideration that could often limit the flexibility of the seat design because the electromechanical components necessary to the implementation of the different functionalities or of automation as well as the complex wiring systems connecting the components could increase the weight of the aircraft seat beyond allowable limits. For example, a seat control unit SCU (Seat Control Unit) can transmit control signals initiated by the passenger to a series of seat actuators, lights, comfort and massage devices, etc., grouped under the name: line-replaceable units LRUs (Line-Replaceable Units), inside the seat of the passenger. In some examples, the SCU and the LRUs are interconnected in series or in a star-like way by a data bus (for example, CANBUS) which enables the LRUs to communicate with each other. Each of the LRUs could include an electric control unit ECU (Electric Control Unit) and serve as the main controller for the other LRUs of the seat. Wiring of the data bus as well as the power wiring and the associated electromagnetic interference (EMI) shielding might result in complex wiring configurations inside the space-limited passenger seat that might be difficult to identify as well as in an increased weight due to wiring and processing components (for example, ECUs) installed in the LRUs. Furthermore, the maintenance of the LRUs could be a difficult and complex process due to the density of wiring in the passenger seats and the electronic complexity of the LRUs.

For example, the regulations of the FAA (Federal Aviation Administration) require airline companies to provide passengers with an on-board passenger service system that communicates basic passenger service functions, such as calling on-board crew and turning on and off the reading lights, to the control system of the aircraft.

Airline companies traditionally provide passenger service systems which are connected to the cabin management system of the aircraft. In general, these systems comprise a passenger control unit which is installed in a seat and wired to the passenger service system, so that passengers could use the passenger control unit to call on-board crew or control a reading light. Nonetheless, these traditional passenger service systems installed in the seats have a considerable weight cost. The weight cost of wiring a passenger control unit to each seat of an aircraft, and supplying any switch or control unit to coordinate the transmission of signals from the passenger control units to the cabin management system of the aircraft, could amount to several thousand kilograms. Consequently, there is a need to provide a wireless passenger service system that communicates the passenger service functions of a passenger control unit to the cabin management system of the aircraft, which could be lighter than traditional passenger service systems.

The document WO2015200368A1 relates to a wireless passenger services system for an aircraft having a power supply system and a cabin management system which includes a wireless receiver and a passenger wireless control unit. The wireless receiver is capable of receiving a wireless signal and is operatively connected to the power supply system and cabin management system of the aircraft. The passenger wireless control unit is capable of sending a signal. In response to the reception of a signal originating from the passenger wireless control unit, the receiver is configured to activate at least one passenger service function of the cabin management system of the aircraft.

To the Applicant's knowledge, no solution currently allows passengers to control their seats and communicate with the on-board crew via a simple wireless connection and a simplified pairing protocol.

OBJECT AND SUMMARY OF THE INVENTION

The main aim of the present invention is to overcome the limitations of the prior art and to propose a new solution for controlling an aircraft seat, easily transposable to different types of seats and seat actuation systems.

To this end, an object of the present invention is a system for controlling a seat and its environment in a cabin of a transport means such as an aircraft, comprising a functional control unit of the seat connected to an electric control unit allowing activating electric actuators and/or effectors such as electric motors of the seat. This control system is remarkable in that it further comprises at least one portable electronic device associated with a passenger of said seat, in that the functional control unit of the seat includes a wireless communication module able to establish a wireless link with the at least one portable electronic device, and in that said apparatus enables the passenger, by means of a dedicated computer interface, to control the actuators and/or the effectors of the seat, and/or to communicate with on-board crew on a local network of the transport means, said wireless communication module being able to communicate on said local network.

Advantageously, the wireless communication module is able to communicate on a local network such as Wi-Fi and/or on a personal network such as Bluetooth.

Other wireless communication protocols may be used, among which mention may be made, non-exhaustively, of: LoRaWan, WAIC, SmartMesh, Sigfox, Zigbee, infrared, radio communication, Li-Fi, etc.

According to a preferred embodiment, the wireless communication module comprises a low-energy Bluetooth BLE module including a BLE antenna coupled to an electronic board.

According to one embodiment, the portable electronic device is a smartphone, a touch digital tablet or a laptop computer.

In a particularly advantageous manner, the portable electronic device allows controlling actuators and equipment of the seat and of its environment from among electric motors for changing positions of the seat between a seated position and a sleep position, a personal lamp, a personal fan, an entertainment device, and an on-board crew call device.

According to one embodiment, the computer interface corresponds to an application program installed on the portable electronic device or to a web page accessible via the local network or the Internet.

For example, the portable electronic device is a smartphone or a digital tablet, and the application computer program is a mobile application having a graphical interface enabling the passenger to directly control the actuators and/or effectors of the seat.

Another object of the invention is a control method, implemented by a control system as disclosed, comprising:

- a secure pairing step to connect the at least one portable electronic device to the functional control unit of the seat;
- a step of accessing a main menu of the application computer program, said menu being displayed on a graphical interface of said program; and
- a step for controlling a functionality of the seat, associated with an actuator, directly on said graphical interface.

Advantageously, the secure pairing step comprises reading of a QR code located on the seat by a camera of the at least one portable electronic device.

Even more advantageously, the secure pairing step comprises an action or a combination of actions from among QR code reading by the portable electronic device, code information on said device, passenger identification, and synchronization of the control application computer program of the seat with another computer program including the number of the seat of the passenger.

According to a preferred embodiment, the transportation means is a commercial aircraft, and the seat is a convertible chair located in a higher comfort class such as first class.

The fundamental concepts of the invention having just been disclosed hereinabove in their most elementary form, other details and features will appear more clearly upon reading the following description and with reference to the appended drawings, giving as a nonlimiting example an embodiment of a wireless control system and method in accordance with the principles of the invention.

BRIEF DESCRIPTION OF THE FIGURES

The figures as well as the elements of the same figure are not necessarily to the same scale. In all figures, identical or equivalent elements bear the same reference numeral.

It is thus illustrated in.

DETAILED DESCRIPTION OF SOME EMBODIMENTS

In the embodiment described hereinafter, reference is made to a system for controlling an aircraft seat and/or its environment by a wireless link of the Bluetooth, Wi-Fi or other type. This nonlimiting example is given for a better understanding of the invention and does not exclude its use in other transport means offering an appropriate level of comfort.

Figure 1:
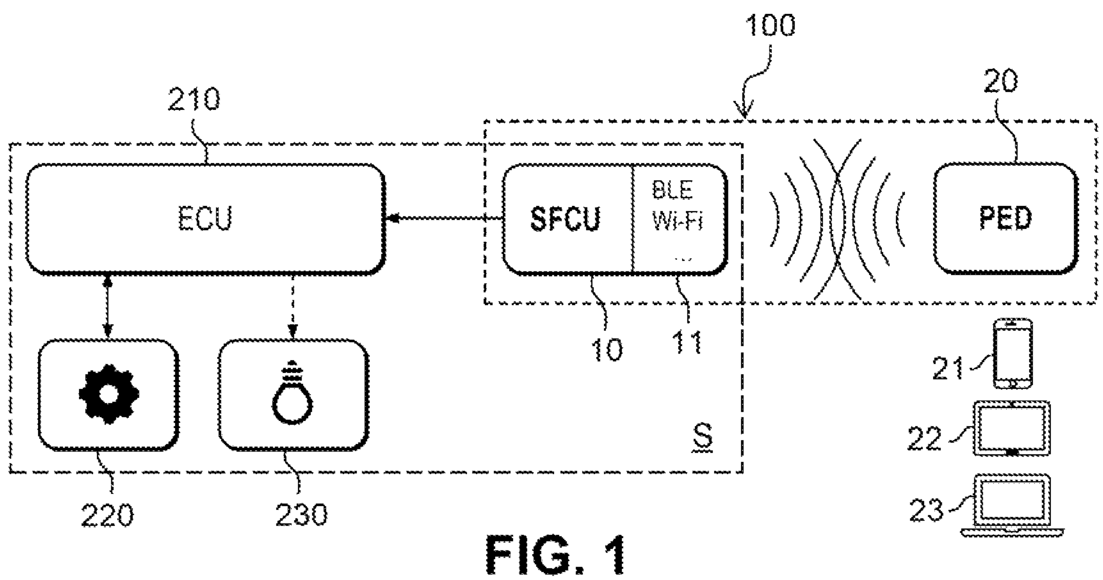
FIG. 1: a block diagram of the wireless control system according to the invention.

FIG. 1 schematically represents the operation of a wireless control system 100 enabling a passenger occupying a seat, not represented, in an aircraft cabin to interact with functionalities of the seat and/or of the environment of said seat. Among the common functionalities offered to the passengers of a commercial aircraft, mention may be made of the configuration of the seat, setting of light and ventilation, and calling on-board crew. One type of interaction is for example the control of the position of the different portions of the seat (backrest, seating area, leg rest, ottoman, partition, mini bar, etc.) so as to configure the seat in a normal, rest or sleep position. In general, the seats of an aircraft offering a comfort class such as a first class are convertible, at least between a seated position and a sleep position.

The wireless control system 100 primarily comprises a functional control unit of the seat 10, able to be connected through a wireless link to a portable electronic device 20 belonging to the passenger, to enable the latter to interact with all or part of the functionalities of the seat, said unit being connected to an electric control unit 210 which controls the different actuators and effectors of the seat, being electromechanical 220, such as the motors operating the movements of the seat, and/or electrical 230 such as the reading lamp and the fan.

The functional control unit of the seat 10, hereinafter referred to by its acronym SFCU (standing for Seat Functional Control Unit), is in the form of a keyboard or a touchscreen for controlling different functionalities of the seat, or simply in the form of a single button for controlling the movement of the seat. Thus, depending on the degree of motorization and options of the seat, the SFCU allows controlling the position of the seat to obtain the desired configuration (seated according to different inclinations or for sleep), to turn the reading lamp on and off (individual light spot), to set its intensity and/or its color, to set the ventilation and/or the air conditioning, to navigate in the offered entertainment service such as audio channels or others and to set the sound volume of the plugged-in headphones, to ask for the arrival of on-board crew, etc.

Other functionalities may also be managed by the SFCU, in particular the interaction of the passenger with the on-board crew, for example to choose and/or order meals, request a special service, activate the "do not disturb" mode, etc.

The portable electronic device 20, hereinafter referred to by its acronym PED (standing for Portable Electronic Device) used in civil aviation jargon, may be any personal electronic device able to communicate wirelessly, process data and equipped with a computing capacity, such as a smartphone 21, a digital tablet 22, a laptop computer 23 and the like.

For the PED 20 to communicate with the SFCU 10, the latter is advantageously equipped with a wireless communication module 11 enabling it to establish a wireless connection with the PED.

The wireless communication module 11 can communicate on a local network, such as Wi-Fi, and/or a personal network such as Bluetooth, preferably Bluetooth low energy BLE (Bluetooth Low Energy) and comprises to this end a BLE antenna coupled to a specific electronic board.

The PED may also be equipped with several wireless communication modules or with a global module enabling it to establish connections on different networks and according to different wireless communication protocols.

It should be noted that the wireless communication module 11 could be added to existing SFCUs with a modification of the frame management algorithms, so as to obtain a wireless control system according to the invention.

Figure 3:
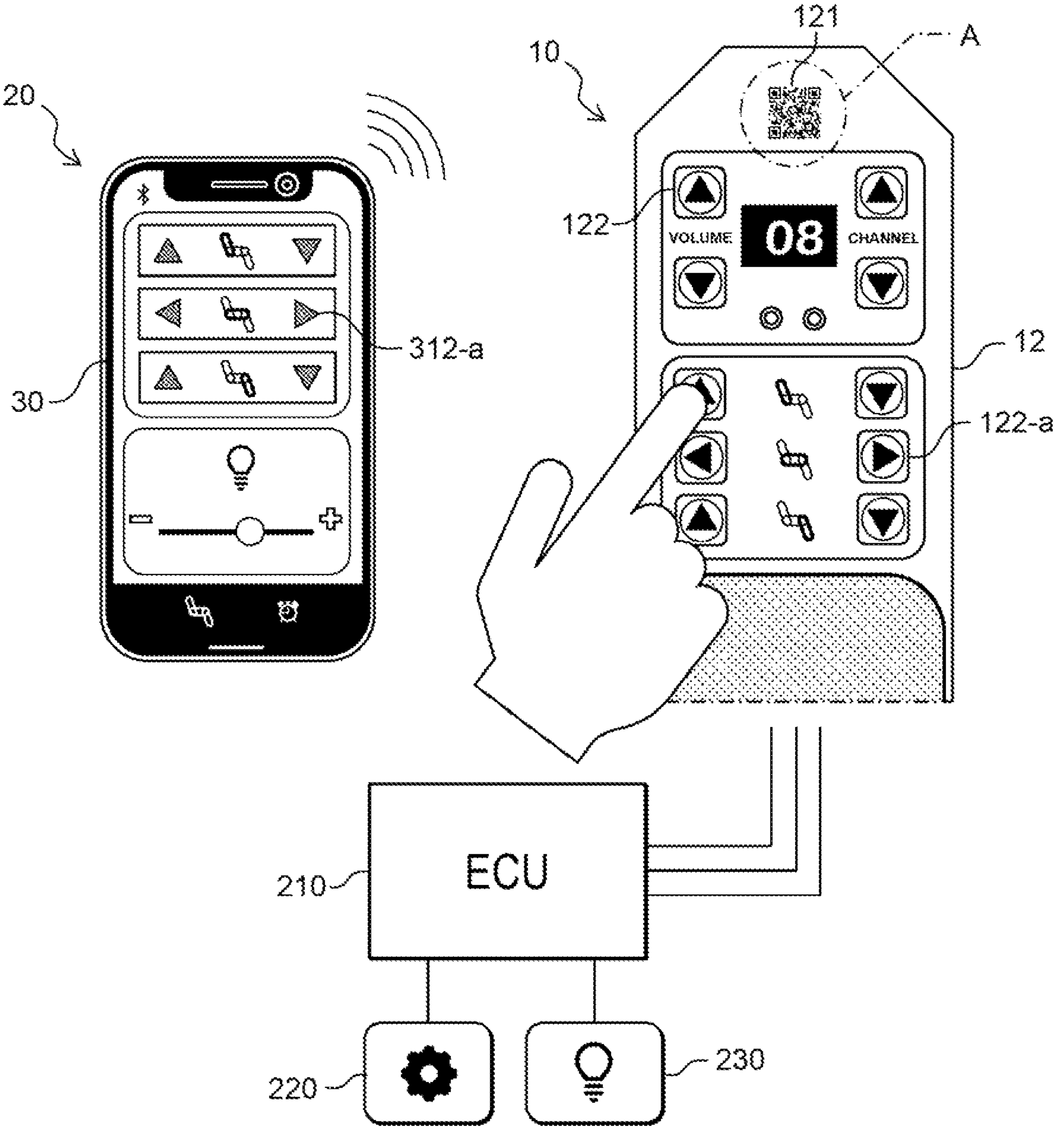
FIG. 3: a diagram of the synergistic operation between a portable electronic device, a functional control unit of the seat and an electric control unit according to the invention.
Figure 4:
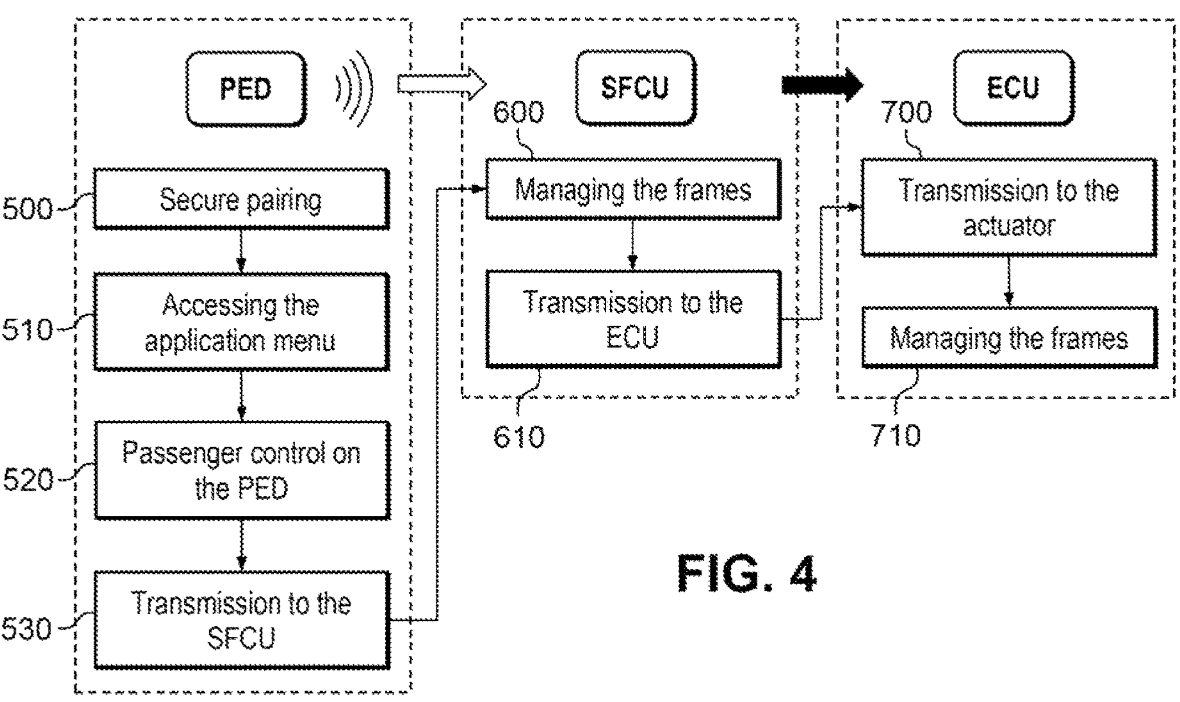
FIG. 4: the main steps of a method for controlling a seat by a portable electronic device via a wireless connection.

Furthermore, the SFCU continues to operate normally, by executing the manual commands, originating from the keyboard for example, while receiving the commands of the PED transmitted by the wireless connection as schematized in FIG. 3.

The use of the wireless control system 100 by the passenger of a seat requires a dedicated mobile application installed on the PED 20.

Of course, in the case of a laptop computer 23, the passenger has an application programing interface (API) or a web page (personal space) to interact with the seat and its environment.

Figure 2:
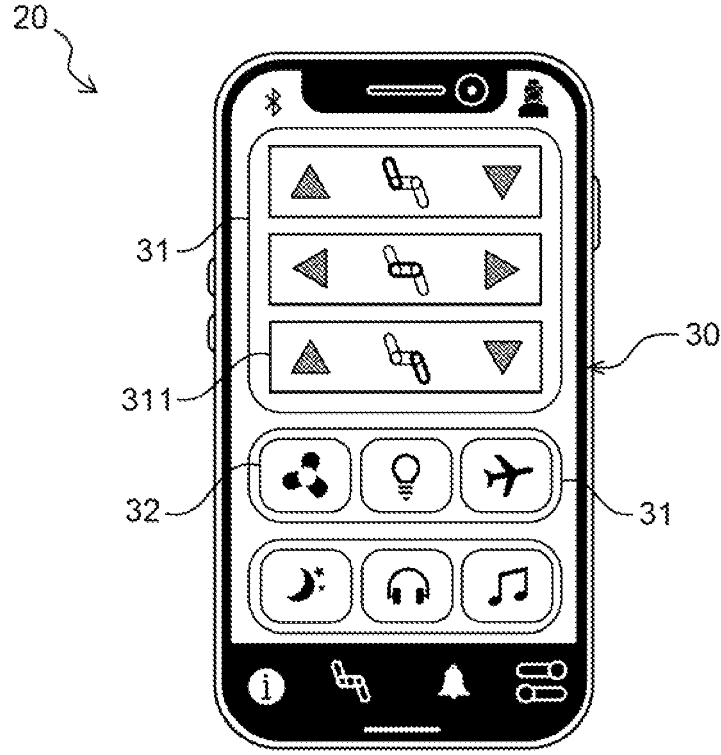
FIG. 2: a schematic view of a graphical interface of a mobile application according to the invention.

FIG. 2 represents an example of a graphical interface 30 that the mobile application could have, and which allows, in a simple and intuitive way, controlling different functionalities of the seat and of the environment of the seat. According to the illustrated example, the graphical interface of the mobile application comprises windows 31, each could correspond to a component, for example the seat, or to a group of functionalities 32, the user could also customize the content of said windows according to his preferences among the set of possible functionalities. For example, access to each functionality 32 is performed by pressing an icon.

Thus, the mobile application installed on the PED could control functionalities from among: the position of the different portions of the seats, namely the headrest, the backrest, the seating area, the leg rest and others, the display of the flight information such as the route, the duration, etc., ventilation, reading light, ambiance light, multimedia service, alarm, crew call, etc.

In addition, the PED may allow for additional and/or more accurate controls than those offered by the SFCU. For example, the PED can allow specifying the nature of the call to the on-board crew (meal, blanket, emergency, etc.) while the SFCU only allows calling the crew without specifying the nature of the request.

Referring to FIG. 3, the control application of the seat may offer a button 312-*a* corresponding to a physical button 122-*a* of the keyboard of the SFCU.

When it comes to the position of the convertible seat, the passenger could manually set the position and/or the inclination of the different portions of the seat, as represented in FIG. 2, or select a predefined position such as the sleeping position, in which case the application has a quick-access icon at this position.

The object of the present invention is not to list the different possibilities that a mobile application dedicated to the control of a seat and of its environment could offer, but to explain the control principle via a wireless link between the SFCU and the PED, the adaptation and the addition of new functionalities forming steps whose implementation does not present any particular difficulty. Thus, the control applications of the seat may be custom developed at the request of operators such as airline companies or aircraft manufacturers. In addition, the application should be adapted to each comfort class in order to take into account the different functionalities that are offered.

The wireless control system 100 thus described allows implementing a seat control method by means of a PED, said method primarily comprising:

- a secure pairing step 500 to connect the PED 20 to the SFCU 10;
- a step 510 of accessing the main menu of the dedicated mobile application;
- a step 520 of control by the passenger to activate a functionality of the seat or of its environment;
- a step 530 of transmission from the PED to the SFCU of the recorded command;
- a step 600 for managing the frames received by the SFCU;
- a step 610 of transmitting the command from the SFCU to the ECU;
- a step 700 of transmitting the command from the ECU to the considered actuator; and
- a step 710 of executing the command by said actuator.

The secure pairing step 500 enables the passenger to connect his PED to the SFCU via the wireless communication module of the latter. The connection may be made on a Bluetooth network, preferably BLE, Wi-Fi, on the in-flight entertainment IFE (In-Flight Entertainment) network, or on any other local or personal wireless communication network (Li-Fi, Lora, etc.). Given the fact that the Wi-Fi network equips more and more airliners to enable passengers to access the Internet, or at least to some limited services such as instant messaging, it is preferable that the wireless connection of the control system is done on a Bluetooth network in order not to affect the speed of the Wi-Fi network in the cabin. That being so especially as most PEDs have a Bluetooth connection.

The secure pairing procedure should enable each passenger to connect to his seat, more specifically to the SFCU of his seat, alone without any risk of erroneous connection to another seat. Therefore, it is possible to consider different pairing protocols or a combination of protocols among: the scanning of a QR code located on the seat of the passenger, for example the code 121 on the keyboard 10 in FIG. 3; entering a code appearing on the SFCU, synchronizing the control application of the seat with the application of the airline company showing the number of the passenger seat; automatic connection according to the distance between the PED and the SFCU which determines the power of the BLE signal; near-field communication NFC (Near Field Communication) when the PED is equipped with an NFC sensor; and any other known means allowing establishing a pairing between two close communicating devices.

Figure 5:
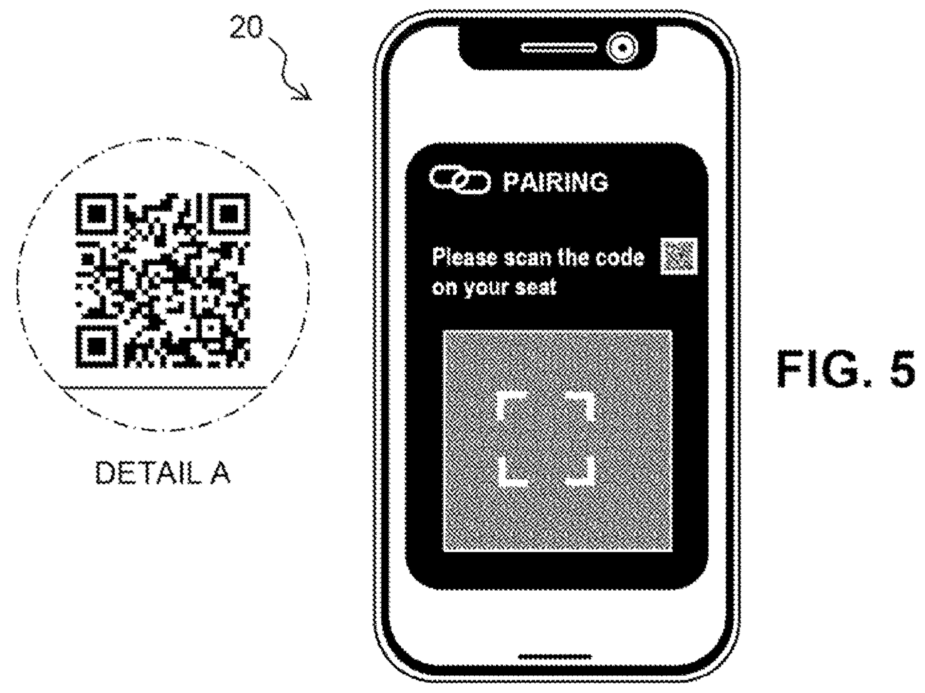
FIG. 5: a schematic view of the interface of the mobile application during pairing by QR code reading.

FIG. 5 represents an example of the QR code reading window by the PED that the control application might offer before accessing the main menu.

The step 510 of accessing the main menu occurs only when the secure pairing step has taken place successfully in order to enable the passenger to interact with the different functionalities that are offered. Thus, the passenger could set the different comfort parameters of his seat without having to move or to reach a remote button, simply with his smartphone within reach regardless of his position, or his laptop computer. Consequently, control of the seat is centralized, which improves the passenger experience during the flight.

The control step 520 consists in using the PED to modify the parameters of the seat and of its environment, by pressing for example on the touchscreen of a smartphone or of a tablet, or by voice command with simple key expressions such as "sleeping mode", "light off", etc. The last case may be reserved for first class suites offering a certain degree of privacy so as not to disturb other passengers nearby.

Afterwards, steps 530 to 710 are automatically executed between the different levels: wireless transmission between the PED and the SFCU, then transmission through an electrical connection between the SFCU, the ECU and the different actuators and equipment.

It should be noted that the present invention could be deployed directly on seat ECUs that do not have SFCUs, in other words, the wireless communication module could be installed directly on the ECU with a higher programing security level.

The wireless control system according to the invention also allows recording the command histories of the passengers on each flight and for each seat, and to exploit this data in order to improve the maintenance of the seats for example. Indeed, the gathered data could be processed and classified by big data techniques to enable aircraft manufacturers, equipment manufacturers, airline companies and others to optimize their maintenance interventions and operations. For example, the seats that have recorded most position change manipulations are subject to greater fatigue of their mechanical parts. In addition, the wireless communication module equipping the SFCU allows transmitting maintenance data and big data derived from the ECU to a mobile terminal of a maintenance and/or monitoring operator, thus avoiding him having to plug into the SFCUs and/or ECUs of all seats of the cabin one-by-one to retrieve this same data.

The mobile control application of the seat can also incorporate a predictive automatic learning model to offer recurring passengers predefined settings either only at the beginning of the flight or throughout the flight, for example, with the selection of an automatic mode.

The wireless control system according to the invention is also interesting in terms of cost reduction and development time. Indeed, the level of criticality generally required for the main SFCUs, according to the DAL (Development Assurance Level) standards, is C. This level corresponds to the case in which a fault in the considered system, in this case the main SFCU, might cause a major problem leading to a malfunction of the vital equipment of the aircraft. In turn, the secondary SFCUs and the comfort elements are generally developed in DAL D or E, in other words, the faults have no effect on flight safety. Therefore, one could consider that the PED is a secondary control means of the seat, in which case the electronic portion managing the BLE connection in the SFCU could be developed in DAL D or E as the case may be. This allows considerably reducing its development cost.

The invention claimed is:

1. A system to control multiple seats and an environment in a cabin of a transportation vehicle, the transportation vehicle comprising:

a local Wi-Fi® network operating in the cabin of the transportation vehicle having a plurality of passengers, the multiple seats and an on-board crew, each seat comprising a functional controller connected to an electric controller to activate at least one of an electric actuator and an effector of said each seat, at least one portable electronic device uniquely associated with a passenger occupying a seat of the transportation vehicle, and comprising a dedicated computer interface, each functional controller comprises a wireless communication module configured to establish a wireless link with said at least one portable electronic device associated with the passenger occupying the seat associated with said each functional controller and to communicate on the local network of the transportation vehicle, said at least one portable electronic device associated with the passenger enables the passenger, by means of the dedicated computer interface, to control said at least one of the electric actuator and the effector of the seat occupied by the passenger, and to communicate with the on-board crew on the local network, wherein a functional controller of the seat occupied by the passenger is further configured to continue to operate normally by executing local manual commands received at the functional controller, while simultaneously receiving and executing commands transmitted from said at least one portable electronic device via said wireless link, so that the passenger can use either manual input via the functional controller of the seat occupied by the passenger or said at least one portable electronic device associated with the passenger to control said at least one of the electric actuator and the effector to change a position of the seat occupied by the passenger, and wherein the wireless communication module comprises a Bluetooth® Low Energy (BLE) module configured to establish the wireless link on a personal area network distinct from the local Wi-Fi network of the cabin, so as not to affect a speed of the Wi-Fi network, the functional controller comprising frame management algorithms configured to process the commands received via the wireless link.

2. The system of claim 1, wherein the BLE module comprises a BLE antenna coupled to an electronic board.

3. The system of claim 1, wherein said at least one portable electronic device is selected from a group consisting of a smartphone, a touch digital tablet, and a laptop computer.

4. The system of claim 1, wherein said at least one of the electric actuator and the effector comprises an electric motor to change the position of the seat.

5. The system of claim 1, wherein the dedicated computer interface is comprised in an application program installed on said at least one portable electronic device.

6. The system of claim 5, wherein the application program is a mobile application to directly control said at least one the electric actuator and the effector.

7. The system of claim 1, wherein the dedicated computer interface is comprised in a web page accessible via the local network.

8. The system of claim 1, wherein said at least one portable electronic device comprises a camera.

9. A control method, implementing the system of claim 8, comprising:

a secure pairing step to connect said at least one portable electronic device with the functional controller;

a step of accessing a main menu of the application program, the main menu being displayed on the dedicated computer interface; and a step of controlling a functionality of the seat, associated with the electric actuator, directly on the dedicated computer interface.

10. The control method of claim 9, wherein the secure pairing step comprises an action selected from the group consisting of reading a QR with the camera, obtaining a code information and filling out a passenger identification; and further comprising synchronizing the application program with another computer program comprising an identification number of the seat of the passenger.

11. The control method of claim 10, wherein the secure pairing step comprises reading of a QR code located on the seat by the camera.

12. The control method of claim 9, wherein the transportation vehicle is a commercial aircraft comprising a first-class cabin and the seat is a convertible chair located in the first-class cabin.

13. The system of claim 1, wherein the functional controller of the seat and said at least one portable device enables the passenger to operate a personal lamp, a personal fan, an entertainment device, and an on-board crew call device.

* * * * *